United States Patent
Panikkar et al.

(10) Patent No.: US 12,430,178 B2
(45) Date of Patent: Sep. 30, 2025

(54) TIME-BOUND TASK MANAGEMENT IN PARALLEL PROCESSING ENVIRONMENT

(71) Applicant: Dell Products L.P., Round Rock, TX (US)

(72) Inventors: Shibi Panikkar, Bangalore (IN); Rohit Gosain, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 622 days.

(21) Appl. No.: 17/537,824

(22) Filed: Nov. 30, 2021

(65) Prior Publication Data

US 2023/0168940 A1 Jun. 1, 2023

(51) Int. Cl.
*G06F 9/50* (2006.01)
*G05B 19/418* (2006.01)

(52) U.S. Cl.
CPC ..... *G06F 9/5038* (2013.01); *G05B 19/41865* (2013.01); *G06F 9/5044* (2013.01); *G06F 9/505* (2013.01)

(58) Field of Classification Search
CPC ...... G06F 9/5038; G06F 9/5044; G06F 9/505; G05B 2219/32423
See application file for complete search history.

(56) References Cited

U.S. PATENT DOCUMENTS

| | | | | |
|---|---|---|---|---|
| 10,191,778 B1* | 1/2019 | Yang | | G06F 11/301 |
| 10,756,990 B1* | 8/2020 | Chakkassery Vidyadharan | | G06F 11/301 |
| 10,891,156 B1* | 1/2021 | Zhao | | G06F 9/4881 |
| 10,908,977 B1* | 2/2021 | Ferstay | | G06F 11/3476 |
| 2008/0172312 A1* | 7/2008 | Synesiou | | G06Q 50/06 705/40 |
| 2017/0063615 A1* | 3/2017 | Yang | | H04L 67/62 |
| 2017/0075731 A1* | 3/2017 | Le Bars | | G06F 11/3442 |
| 2017/0185455 A1* | 6/2017 | Le Bars | | G06F 9/5044 |
| 2017/0344618 A1* | 11/2017 | Horowitz | | G06F 16/27 |
| 2019/0158425 A1* | 5/2019 | Aronovich | | H04L 43/20 |
| 2019/0342184 A1* | 11/2019 | May | | G06N 5/02 |
| 2020/0021644 A1* | 1/2020 | Panikkar | | H04L 67/1012 |
| 2020/0167195 A1* | 5/2020 | Aronovich | | H04L 67/1036 |
| 2021/0135973 A1* | 5/2021 | Vedam | | G06F 9/54 |
| 2021/0142322 A1* | 5/2021 | Kim | | G06Q 20/405 |
| 2021/0240517 A1* | 8/2021 | Mohapatra | | G06F 9/445 |

(Continued)

OTHER PUBLICATIONS

N. Yehia, "Kubernetes Self Remediation (AKA Poison Pill)," https://www.openshift.com/blog/kubernetes-self-remediation-aka-poison-pill, Nov. 18, 2020, 4 pages.

(Continued)

*Primary Examiner* — Dong U Kim

(74) *Attorney, Agent, or Firm* — Ryan, Mason & Lewis, LLP

(57) ABSTRACT

Techniques for task management in a parallel processing environment are disclosed. For example, a method comprises obtaining an indication of a data load for a given task, a time range within which the given task is to be executed, and a resource utilization limit for executing the task. The method computes a number of processes to be instantiated to execute the given task for the data load within the time range and the resource utilization limit. The method then schedules the given task to be executed by the computed number of processes in a parallel processing environment.

20 Claims, 10 Drawing Sheets

(56) References Cited

U.S. PATENT DOCUMENTS

2022/0230462 A1* 7/2022 Xu .................. G06V 30/19113
2023/0020330 A1* 1/2023 Schwerin ............. G06F 16/256

OTHER PUBLICATIONS

Github, "HPE CSI Driver for Kubernetes," https://github.com/hpe-storage/csi-driver, accessed Feb. 4, 2021, 3 pages.
Github, "Stork—Storage Operator Runtime for Kubernetes," https://github.com/libopenstorage/stork, accessed Feb. 4, 2021, 8 pages.

* cited by examiner

| Number of Threads | Load (Unit of Process) | Time taken | CPU | Memory |
|---|---|---|---|---|
| 1 | 1 | 1.2 secs | 30.20% | 38.50% |
| 2 | 2 | 2 secs | 31.40% | 38.80% |
| 2 | 4 | 3.45 secs | 32.67% | 39.78% |
| 2 | 10 K | 10 Mins | 38.34% | 42.54% |
| 2 | 50 K | 27 Mins 45 Secs | 39.72% | 45.34% |
| 2 | 100 K | 1 Hour 28 Mins | 52.87% | 62.76% |
| 4 | 50 K | 18 Mins 45 Sec | 64.67% | 71.02% |
| 4 | 75 K | 33 Mins 32 Secs | 65.21% | 71.14% |
| 4 | 100 K | 40 Mins 23 Secs | 66.87% | 71.45% |
| 6 | 75 K | 20 Mins 44 Secs | 68.20% | 74.22% |
| 6 | 100 K | 25 Mins 21 Secs | 69.50% | 76.34% |
| 8 | 75 K | 19 Mins 34 Secs | 72.30% | 82.40% |
| 8 | 100 K | 22 Mins 45 Secs | 73.60% | 83.70% |
| 10 | 75 K | 21 Mins 13 Secs | 83.10% | 91.45% |
| 10 | 100 K | 28 Mins 54 Secs | 85.20% | 93.40% |

FIG. 8

TIME-BOUND TASK MANAGEMENT IN PARALLEL PROCESSING ENVIRONMENT

FIELD

The field relates generally to information processing systems, and more particularly to task management in such information processing systems.

BACKGROUND

Information processing systems increasingly utilize reconfigurable virtual resources to meet changing user needs in an efficient, flexible and cost-effective manner. For example, cloud-based computing and storage systems implemented using virtual resources in the form of containers have been widely adopted. Such containers may be used to provide parallel processing functionality when processing a task (e.g. data processing job) in a given information processing system. However, significant technical problems arise with task management in such parallel processing environments.

SUMMARY

Illustrative embodiments provide techniques for task management in a parallel processing environment.

For example, in an illustrative embodiment, a method comprises the following steps. The method obtains an indication of a data load for a given task, a time range within which the given task is to be executed, and a resource utilization limit for executing the task. The method computes a number of processes to be instantiated to execute the given task for the data load within the time range and the resource utilization limit. The method then schedules the given task to be executed by the computed number of processes in a parallel processing environment.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable, inter alia, a task manager to find the optimal number of parallel processes or threads required for a given load to complete the task within the range of time configured, with less than a given percentage of resource utilization in that environment.

While such task management techniques are particularly effective in pod-based container environments, it is to be appreciated that the techniques can be implemented in other computing environments.

These and other illustrative embodiments include, without limitation, apparatus, systems, methods and computer program products comprising processor-readable storage media.

BRIEF DESCRIPTION OF THE DRAWINGS

FIG. 8 illustrates a tabular example of metrics stored for use in a task management methodology with time-bound containerized workload functionality according to an illustrative embodiment.

DETAILED DESCRIPTION

Figure 1:
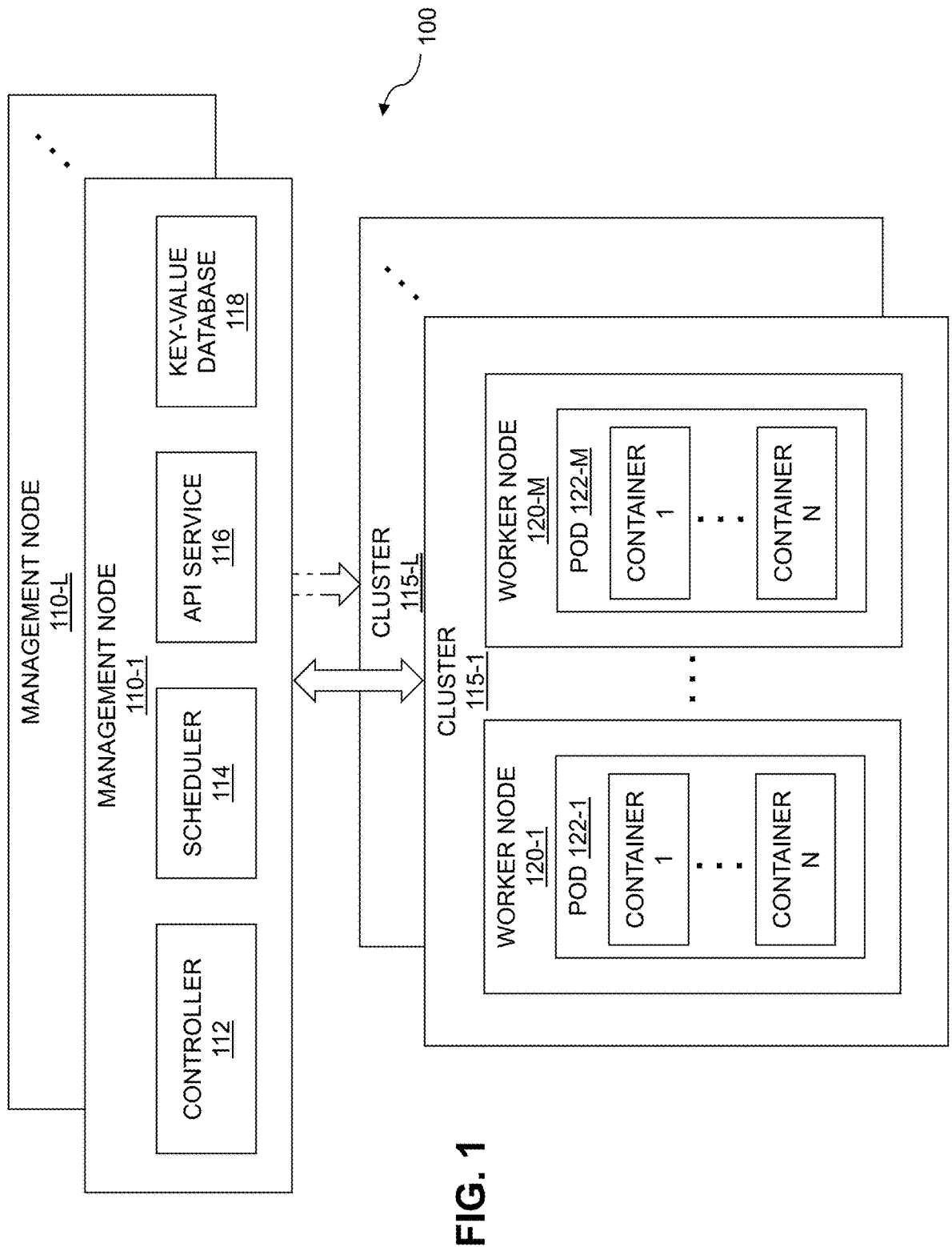
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system to form a parallel processing environment. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a least one management (master) node. A Kubernetes environment may include multiple clusters respectively managed by multiple management nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of management nodes 110-1, . . . 110-L (herein each individually referred to as management node 110 or collectively as management nodes 110) are respectively operatively coupled to a plurality of clusters 115-1, . . . 115-L (herein each individually referred to as cluster 115 or collectively as clusters 115). As mentioned above, each cluster is managed by at least one management node. Illustrative embodiments provide for application copy management across multiple clusters (e.g., from one cluster of clusters 115 to another cluster of clusters 115), as will be further explained in detail herein.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of containers 1, . . . N (each pod may also have a different number of containers). As used herein, a pod may be referred to more generally as a containerized workload. Also shown in FIG. 1, each management node 110 comprises a controller 112, a scheduler 114, an application programming interface (API) service 116, and a key-value database 118, as will be further explained. However, in some embodiments, multiple management nodes 110 may share one or more of the same controller 112, scheduler 114, API service 116, and key-value database 118.

Worker nodes 120 of each cluster 115 execute one or more applications associated with pods 122 (containerized workloads). Each management node 110 manages the worker nodes 120, and therefore pods 122 and containers, in its corresponding cluster 115. More particularly, each management node 110 controls operations in its corresponding cluster 115 utilizing the above-mentioned components, i.e., controller 112, scheduler 114, API service 116, and a key-value database 118. In general, controller 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
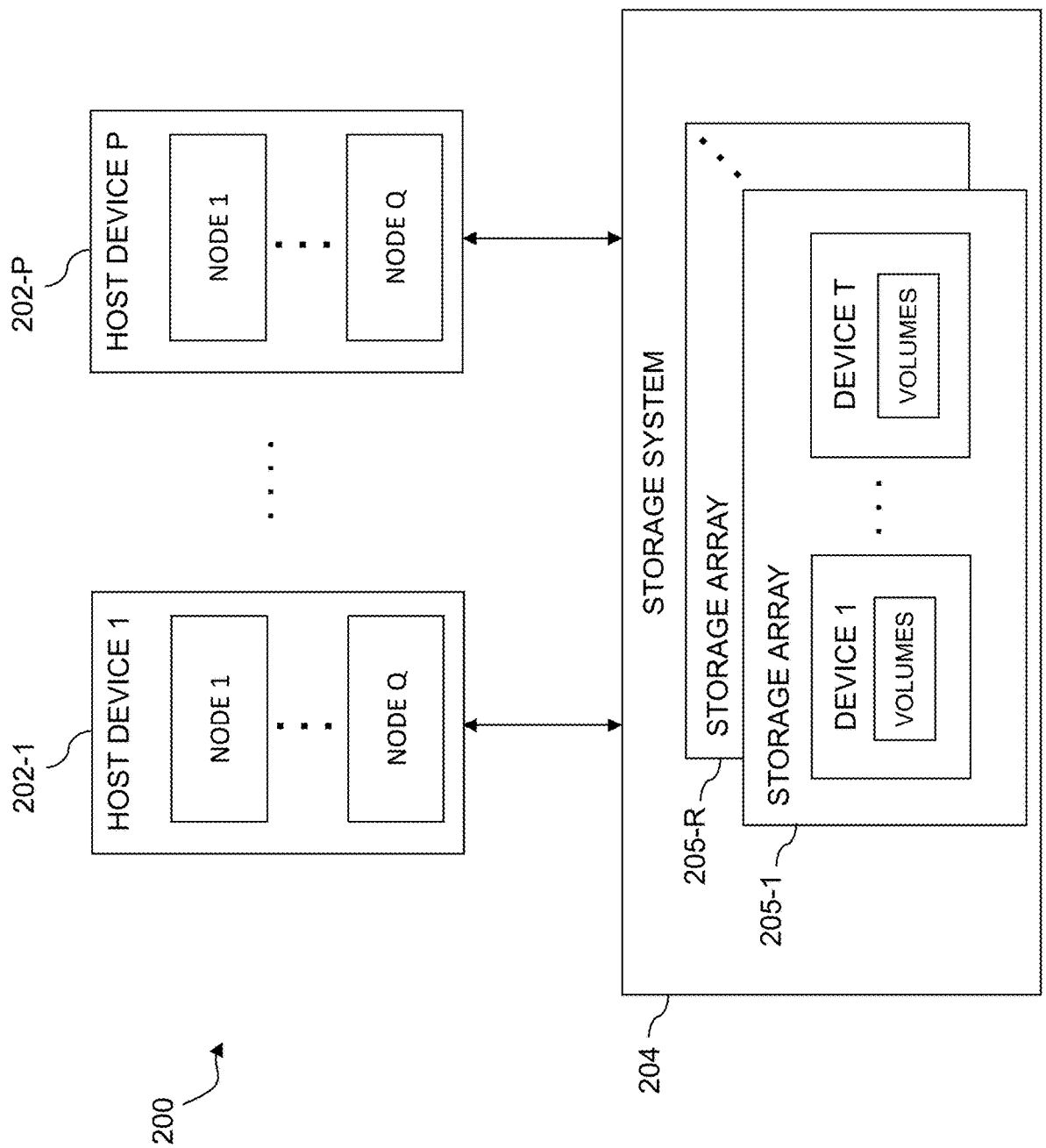
FIG. 2 illustrates host devices and a storage system within which one or more illustrative embodiments can be implemented.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . Q. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, . . . T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . Q on a given host device 202 can be a management node 110 or a worker node 120 (FIG. 1). In some embodiments, a node can be configured as a management node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . Q is stored as persistent storage volumes in one or more of the storage devices 1, . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with additional figures.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds).

As mentioned above, a Kubernetes pod may be referred to more generally herein as a containerized workload. One example of a containerized workload is an application program configured to provide a microservice. A microservice architecture is a software approach wherein a single application is composed of a plurality of loosely-coupled and independently-deployable smaller components or services. Container-based microservice architectures have profoundly changed the way development and operations teams test and deploy modern software. Containers help companies modernize by making it easier to scale and deploy applications. By way of example, Kubernetes helps developers and microservice operations teams because it manages the container orchestration well. However, Kubernetes is more than a container orchestrator, as it can be considered an operating system for cloud-native applications in the sense that it is the platform that applications run on, (e.g., just as desktop applications run on MacOS, Windows, or Linux). Tanzu from VMWare is a suite of products that helps users run and manage multiple Kubernetes (K8S) clusters across public and private cloud platforms.

Thus, it is realized that microservices provide an ideal architecture for continuous delivery. For example, in an illustrative microservice architecture, each application may reside in a separate container along with the environment it needs to run. Because of this, each application can be edited in its container without the risk of interfering with any other application. However, while there are countless benefits of microservices, the microservice architecture introduces new challenges to developers. One of the main challenges microservices introduces is managing a significant number of microservices for an application.

Several enterprise vendor platforms and Software-as-a-Service (SaaS) frameworks have been introduced to manage microservices such as, but not limited to, Kubernetes, Docker, Pivotal Cloud Foundry (PCF), Azure Kubernetes Service (AKS), Pivotal Container Service (PKS), etc. Along with other microservice management features, these frameworks and platforms attempt to address the scalability of microservices. For a given microservice-based application, as the request load increases or decreases, the container needs to increase or decrease the instances of microservices. In current microservice container environments, automatic scaling or "auto-scaling" is used to attempt to ensure that an application has a sufficient amount of targeted resource capacity allocated to handle the traffic demand. However, current auto-scaling solutions do not address important scaling issues.

Auto-scaling is an important concept in cloud automation, particularly in parallel processing applications. Without auto-scaling, resources (e.g., compute, storage, network, etc.) have to be manually provisioned (and later scaled down) every time conditions change. As such, it will be less likely that the container computing environment will operate with optimal resource utilization and cloud spending.

In the Kubernetes framework, there are actually three auto-scaling features: horizontal pod auto-scaler (HPA), vertical pod auto-scaler (VPA), and cluster auto-scaler (CA). HPA is based on a scale-out concept manually allowing administrators to increase or decrease the number of running pods in a cluster as application usage (e.g., requests) changes. VPA is based on a scale-up concept by adding more central processing unit (CPU) or memory capacity to a cluster. CA is based on a concept of adding or removing clusters in case a cluster itself is overloaded. HPA is typically considered a best practice, i.e., to ensure enough resources are allocated for sufficient operation of a microservice within a cluster. Further, in Kubernetes, an administrator can manually specify a fixed targeted utilization parameter with respect to resources to start replication of a microservice instance.

Pods can thus be horizontally auto-scaled in the Kubernetes framework according to load. Using this auto-scaling property (HPA) of Kubernetes, microservices in Kubernetes can be used not only for short synchronous calls, but also for so-called "long running" tasks as well. By way of example, consider the following three types of long running microservices:

(i) Continuous streaming type data processing, e.g., data pipeline, mediation;
(ii) Non-time-critical batch job type data processing, e.g., pushing data into a data lake; and
(iii) Time-critical batch job type data processing e.g., demand and supply planning data processing for an enterprise such as, e.g., an original equipment manufacturer (OEM).

The present disclosure focuses mainly on type (iii) long running microservices, batch jobs that are time-critical in nature. For example, batch processing involves jobs (tasks) that can execute without user interaction or that can be scheduled, as resources are available, to execute. Batch jobs that are considered time-critical are ones where the next execution run is dependent on the previous data load.

By way of one OEM scheduling system example, assume that at the end of a data processing operation, order planning for a factory has to occur by 8 AM in the morning before the manufacturing shift commences. In this type of data processing, the data load is known to the scheduling system. The data load may vary each day from very low to very high as per the order status. Typically, a scheduling system initiates tasks at each state at a particular time. However, there is no existing mechanism or methodology to specify for tasks, processed by an underlying pod-based computing environment, to complete in a specific time period. Rather, currently, the scheduling system spins off pods for parallel processing to attempt to reduce the processing time.

Further, somedays the data load may be high while other days it may be low. However, existing scheduling systems allocate the same resources leading to the time of execution completing too late on high load days and completing too early on low load days. Also, if the scheduling system adds too many parallel processes, this can lead to an out-of-memory error or some other adverse condition.

In sum, it is realized herein that even though a scheduling system may know the total data loads to be processed (e.g., mostly from a source data store), it does not know how much time it will take to complete the task, nor does it know the optimal parallel processing needed to be spun off to complete the task within a specific time period with optimal resource consumption.

Illustrative embodiments overcome the above and other drawbacks associated with existing scheduling systems. More particularly, illustrative embodiments enable an ability to set a time range (i.e., minimum time and maximum time) for scheduling varied-load, long running task-based microservice requests. Illustrative embodiments will be described now in the context of FIGS. 3-7.

Figure 3:
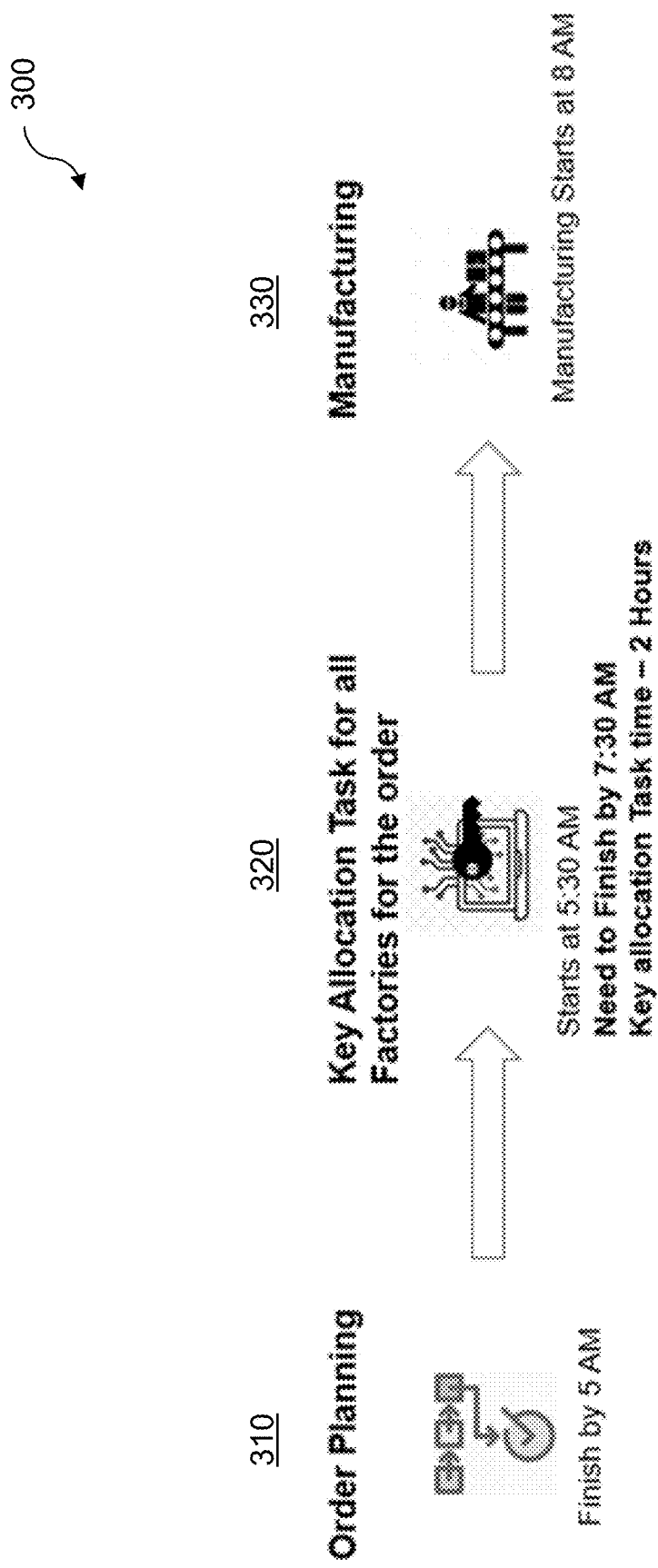
FIG. 3 illustrates exemplary tasks of an equipment manufacturing process with which one or more illustrative embodiments can be implemented.

As mentioned above, a Kubernetes microservices framework can be used by an OEM to manage computer-implemented tasks and other tasks associated with an equipment manufacturing process. By way of example, an equipment manufacturing process 300 is shown in FIG. 3. It is assumed that an equipment order planning task 310 (e.g., where customer orders for the equipment are processed and scheduled for manufacturing) has to be finished by 5 AM since a license key allocation task 320 (e.g., where unique digital codes are assigned to the equipment to be used by the customers to unlock purchased functionality in the equipment), which takes two hours, has to start by 5:30 AM in order to finish by 7:30 AM. The actual equipment manufacturing task 330 starts at 8 AM when the manufacturing labor shift begins work at each factory. Assuming the equipment manufacturing process 300 is managed using a Kubernetes microservices framework, certain microservices are typically scheduled and executed including data pipeline, demand and supply planning, data load tasks, and license key allocation. These tasks are considered time-critical since a later task starting on-time depends on a previous task completing on-time, e.g., license key allocation task 320 which is known to take two hours has to start and complete before actual manufacturing task 330 can start. Furthermore, since order planning task 310 includes demand and supply planning that runs in a daily cycle (or some other time cycle such as weekly), order planning task 310 is also considered time-critical. Demand and supply planning can include several time-critical sub-tasks such as a unit purchase plan (UPP) task, a material purchase plan (MPP) task, a replenishment plan (RP) task, an attach rate task, and a supply planning task.

Typically, in the long running tasks, the scheduling system calls the Kubernetes pods. The number of records to be processed can vary, e.g., 10K records one time, 100K another time, 10,000K another time, and so on. While the scheduling system may know how many records need to be processed, it is realized herein that current scheduling systems do not know how many parallel processes need to be executed to complete a task in an optimal time range with optimal resource consumption. Time and resource consumption depends on how many pods in the Kubernetes framework are going to perform the job with certain resource availability and HPA functionality.

Figure 4:
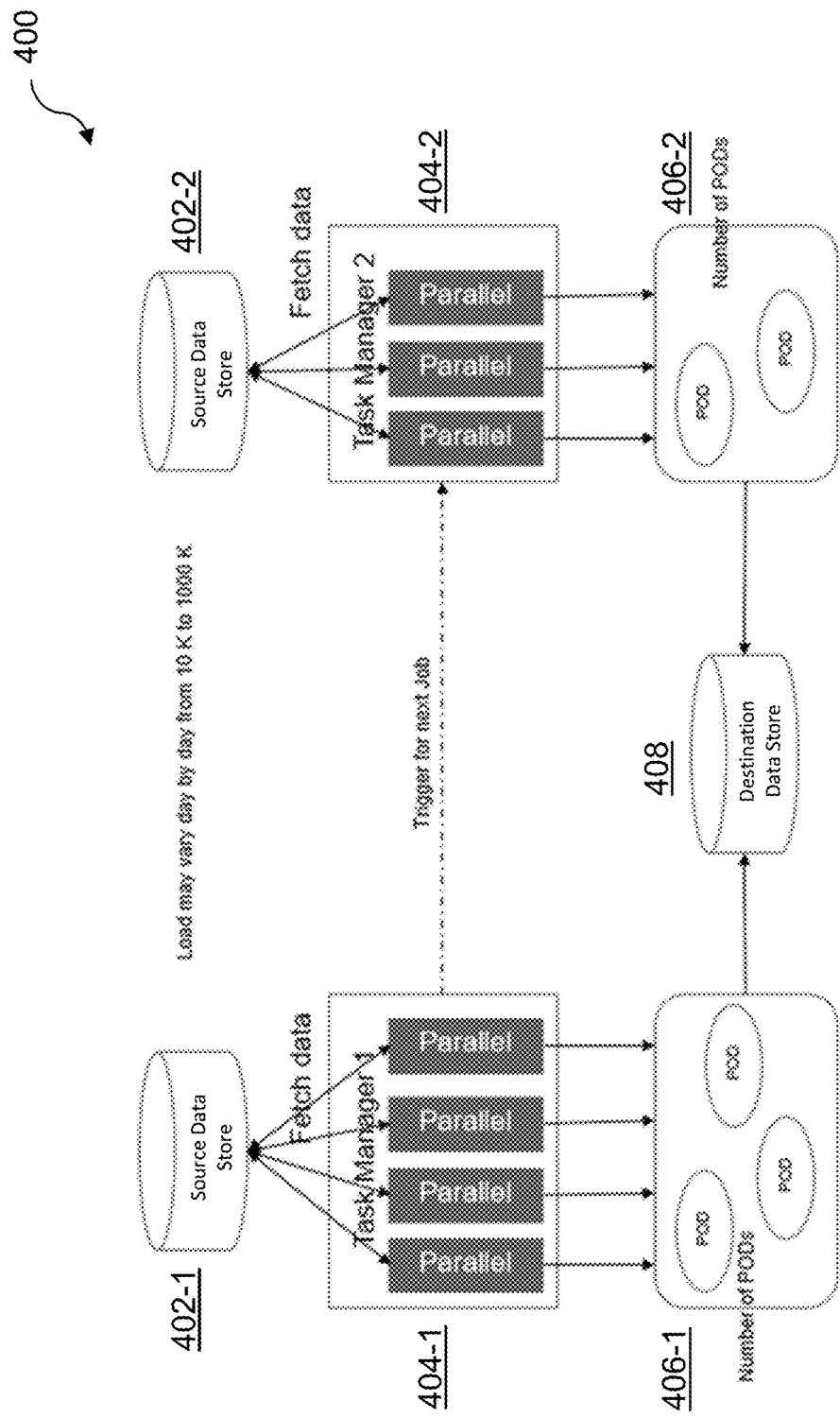
FIGS. 4 and 5 respectively illustrate use cases for task management in a parallel processing environment with which one or more illustrative embodiments can be implemented.

These technical problems are illustrated in pod-based framework 400 shown in FIG. 4. As shown, for a first set of source data from a first source data store 402-1, a first task manager 404-1 instantiates a first plurality of parallel processes that are executed in a first plurality of pods 406-1. Similarly, for a second set of source data from a second source data store 402-2, a second task manager 404-2 instantiates a second plurality of parallel processes that are executed in a second plurality of pods 406-2. The resulting data from execution of the first and second pluralities of pods 406-1 and 406-2 is stored in a destination data store 408. It is assumed that completion of the parallel processes managed by task manager 404-1 is a trigger for task manager 404-2 to start its parallel processes. However, as mentioned above, while a current scheduling system that underlies pod-based framework 400 may know how many records are in each of first and second source data stores 402-1 and 402-2, the scheduling system is not able to determine optimal timing and optimal resource consumption across the task managers 404-1 and 404-2 for the pluralities of pods 406-1 and 406-2. If one of the task managers 404-1 and 404-2 add too many parallel processes in the task, an unnecessary number of pods would get initialized, which may completely consume a resource or cause an out of memory error. Also, executing too many parallel processes may result in a task completing too early, which could then adversely affect timing in dependent tasks (e.g., recall above that completion of the task managed by task manager 404-1 triggers the task managed by task manager 404-2 to start). However, if too few parallel processes are executed by task manager 404-1, its task will not get completed in time for the next (dependent) task managed by task manager 404-2.

Thus, even though a pod-based framework such as microservice orchestration in Kubernetes is backed up with a sophisticated horizontal scaling functionality, it still depends on resource usage (e.g., CPU and memory). When CPU or memory crosses a threshold usage setting, Kubernetes initiates a new instance of the microservice/pod. In a time-critical bulk data processing scenario, long running tasks are managed by the scheduling system with parallel processes (processing threads) being instantiated for a known load. However, the scheduling system does not know how many parallel processes are needed to be initialized for a specific number of records (load) to be processed in a specific environment to complete the task in a pre-determined time range. Note that, as illustratively used herein, the terms "parallel processes" and "parallel threads" are used interchangeably.

Figure 5:
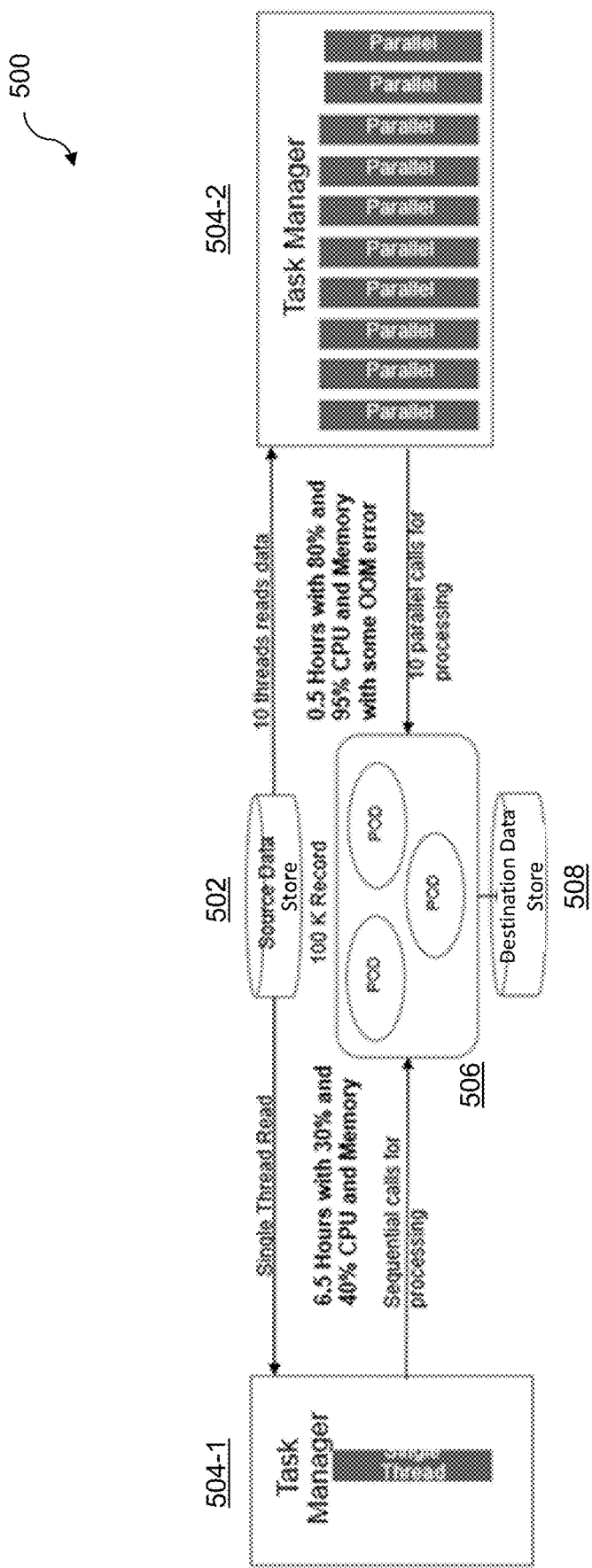

These technical problems are further illustrated in pod-based framework 500 shown in FIG. 5. Assume here that a set of source data from a source data store 502 is accessed by a first task manager 504-1 and a second task manager 504-2. First task manager 504-1 instantiates a single thread, performs a single thread read, and sends sequential calls for processing to a plurality of pods 506. Further, second task manager 504-2 instantiates 10 parallel processes, performs 10 thread reads, and sends 10 parallel calls for processing to the plurality of pods 506. The resulting data from execution of the plurality of pods 506 is stored in a destination data store 508.

Assume the system is handling a replenishment planning (RP) data load in a demand planning use case scenario. The job run starts at 9 AM. The supply team will start the run at 11 AM. Thus, the RP data load needs to be completed beforehand. This means that the system has less than two hours to load the data. That gives a time range to complete the job of a minimum of one hour (i.e., there is no gain if the job is completed before the minimum time since it will just sit there until it is needed by the next step) and a maximum time of one hour and fifty minutes (i.e., if it goes beyond that, the supply planning team will not be able to run their process).

Now assume first task manager 504-1 and its single thread is used to process the job, then as shown in FIG. 5, it will take 6.5 hours with 30% CPU consumption and 40% memory consumption, respectively (less pod initialization). Assume now that second task manager 504-2 and its 10 parallel threads are used to process the job. As shown, it will complete in one half hour with 80% CPU consumption and 95% memory consumption (with a larger number of pods initialized as the load increases).

Neither of the two processing scenarios are preferred. If the single thread approach (first task manager 504-1) is taken, the planning will be disrupted because the job will infringe on the planning start time. However, if the 10 parallel processes approach (second task manager 504-2) is taken, this approach will take up almost all CPU and memory, and other microservices may fail due to the resource strain. Moreover, there is no gain if the job is completed in half an hour as mentioned above.

Accordingly, it is desirable for a scheduling system to be able to know how many parallel processes need to be initialized for a specific number of units of processing (e.g., a number of records) to be processed in a specific environment to complete the task in a pre-determined time range. Thus, in the above example, it would be desirable to find the optimal number of parallel processing threads for a given environment which will execute within two hours with optimal resource utilization.

Illustrative embodiments provide technical solutions that overcome the above and other technical problems. For example, one or more illustrative embodiments provide techniques for time-bound containerized workload scheduling in a container (e.g., pod-based) computing environment. More particularly, a task manager of a scheduling system is configurable to set a minimum time and a maximum time (a range of time) within which a given job (task, process, etc.) should execute. It is realized that the task manager should not be configured to initiate a static number of threads (parallel processes) to complete the task within the time range in order to achieve optimal resource utilization and stability, since load is different in each run, and available resources are different in each environment. Accordingly, illustrative embodiments provide for two modes of execution of tasks: (i) an inspection mode; and (ii) a run mode.

For example, in an illustrative inspection mode, the task manager finds the optimal number of threads (parallel processes) required for a given load to complete the task within the range of time configured, with less than a given percentage of resource utilization in that environment (e.g., even in production). If the task manager cannot complete the task, it will notify the user (e.g., send a message to the user), and user may want to increase the time range by shifting left the starting time of the task or by reducing the load even before the task starts executing.

Once the task manager, in the inspection mode, finds the optimal threads to be used, the task manager sets the thread configuration and changes to run mode with that setting.

The user can change to inspection mode in a regular interval and cause the task manager to re-inspect the settings. Since the resources and the database await changes over a time period, the response time of pods also varies over a time period. Further, the task manager re-inspects the settings automatically if the execution time is more than the maximum specified.

Figure 6:
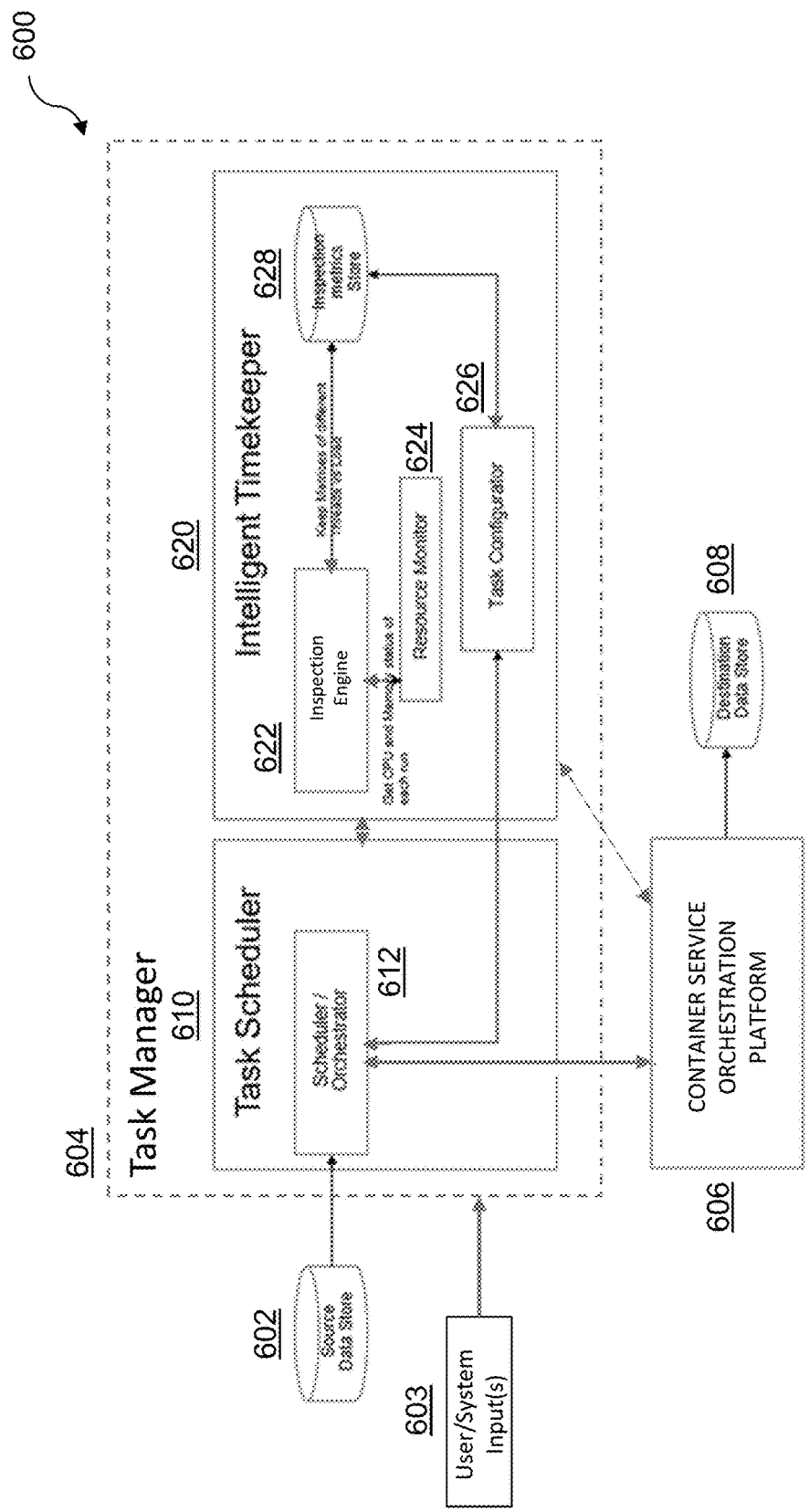
FIG. 6 illustrates a task management framework with time-bound containerized workload functionality according to an illustrative embodiment.

FIG. 6 illustrates a task management framework 600 with time-bound containerized workload functionality according to an illustrative embodiment. More particularly, as shown, a set of source data from a source data store 602 is accessed by a task manager 604, which also receives user/system input(s) 603, as will be further explained below. Task manager 604 instantiates a set of one or more processing threads and sends one or more calls for processing to one or more pods in a container service orchestration platform 606 (e.g., Kubernetes pod-based framework). The resulting data from execution of the one or more pods in the container service orchestration platform 606 is stored in a destination data store 608. It is to be appreciated that, in some illustrative embodiments, task manager 604 can be implemented in a management node 110 of FIG. 1, while the container service orchestration platform 606 can be implemented in one or more worker nodes 120 of FIG. 1.

As further shown, task manager 604 is comprised of modules including a task scheduler 610 and an intelligent timekeeper 620. Task scheduler comprises a module including a scheduler/orchestrator 612, while intelligent timekeeper 620 comprises modules including an inspection engine 622, a resource monitor 624, a task configurator 626, and an inspection metrics store 628, as will be further explained below. While the task scheduler 610 provides typical functionality for scheduling, intelligent timekeeper 620 provides functionality for instructing task scheduler 610 based on a determination of the optimal number of parallel processing threads for a given environment which will execute within an time range with optimal resource utilization. Note that task manager 604, task scheduler 610 and intelligent timekeeper 620 may comprise more, less, and other modules than those expressly shown in FIG. 6. That is, the specific modules shown in FIG. 6 are used to visually depict functionalities associated with illustrative embodiments, and are not necessarily intended to be limiting in nature.

Figure 7:
FIG. 7 illustrates a task management methodology with time-bound containerized workload functionality according to an illustrative embodiment.

In an illustrative embodiment, with reference to a methodology 700 of FIG. 7 in conjunction with task management framework 600 of FIG. 6, a user and/or another system, i.e., user/system inputs 603, specifies to task manager 604 a range of time with a minimum time duration and a maximum time duration, MIN_TIME and MAX_TIME, for a task that needs to be executed, i.e., step 702.

Further, in step 704, user/system inputs 603 also specify to task manager 604 a (actual or approximate) largest number of data units, MAX_PROCESS_UNITS, expected to execute for the task, e.g., number of records, data sets, or number of rows in a source table in source data store 602. Also, in step 704, user/system inputs 603 specify a resource utilization limit such as, e.g., 80% (i.e., task will not exceed 80% CPU consumption or 80% memory consumption).

Still further, in step 706, user/system inputs 603 also specify to task manager 604 a selection between an inspect mode and a run mode. The various user/system inputs 603 are provided to inspection engine 622 of intelligent timekeeper 620.

In step 708, when inspection mode is selected, intelligent timekeeper 620 starts a single thread and starts the task, and records the time for a single record transaction to complete. By way of example only, this may comprise task configurator 626 of intelligent timekeeper 620 instructing scheduler/orchestrator 612 of task scheduler 610 to: read one record from the source table in source data store 602; prepare a request; call the appropriate microservice in container service orchestration platform 606 to process the request; and receive the response from the microservice that the single record transaction task is completed.

In step 710, resource monitor 624 obtains the CPU and memory consumption percentage data of the server (or other underlying physical infrastructure) of container service orchestration platform 606 that ran the microservice for the single record transaction, and provides the data to inspection engine 622. Resource monitor 624 also records the total round trip time (RTT) associated with the request/response for this single record transaction during inspection mode, e.g., UNIT_ROUND_TRIP_TIME.

In step 712, inspection engine 622 checks if UNIT_ROUND_TRIP_TIME is less than MAX_TIME. If yes, then inspection engine 622 multiplies UNIT_ROUND_TRIP_TIME with MAX_PROCESS_UNITS.

If, in step 714, inspection engine 622 determines the product of UNIT_ROUND_TRIP_TIME and MAX_PROCESS_UNITS is less than MAX_TIME, then it is safe to mark the task as Single Thread (i.e., task can be executed in run mode by initiating a single processing thread).

If, in step 716, inspection engine 622 determines that the product of UNIT_ROUND_TRIP_TIME and MAX_PROCESS_UNITS is greater than or equal to MAX_TIME, then task configurator 626 instructs scheduler/orchestrator 612 to iteratively add one more thread and start parallel processing from step 708, until UNIT_ROUND_TRIP_TIME is less than MAX_TIME.

It is realized that in any information processing system, if more parallel processing threads are added, this will reduce the response time. However, it is further realized herein that at a certain point of adding more threads, the response time will start deteriorating because of clogging of parallel processing in the data store layer or a CPU/memory resource strain. As such, inspection engine 622 finds the resource consumption tripping point, i.e., PROBABLE_NUMBER_OF_MAX_THREADS, in step 718.

If PROBABLE_NUMBER_OF_MAX_THREADS of the particular task takes more than MAX_TIME, then, in step 720, inspection engine 622 generates an error to the user/system for mitigation either by increasing MAX_TIME and shifting left the starting time or reducing the load (e.g., the number of records to be processed in a task).

Note that the metrics collected and/or computed by inspection engine 622 (MIN_TIME, MAX_TIME, MAX_PROCESS_UNITS, UNIT_ROUND_TRIP_TIME, PROBABLE_NUMBER_OF_MAX_THREADS, as well as and any other metrics or other data) are stored in inspection metrics store 628, in step 722, for use in instructing scheduler/orchestrator 612 on how many threads or other processing units to instantiate for executing the task during run mode.

Accordingly, by way of example of methodology 700 described above, when task manager 604 runs in production for the first time, it executes in inspection mode starting with a single thread and a single unit of process (e.g., single record transaction). Task manager 604 records information including the number of threads, data load (e.g., number of records), time taken, CPU consumption, and memory consumption. Then, task manager 604 increases the threads (parallel processes) and load systematically and records the various metrics. After a point of time, increasing the parallel threads will result in an increase in the time taken or start generating errors. Now, task manager 604 can find the optimal combination of parallel threads for a given load.

By way of a specific example, assume for a given task, the user sets the expected time range and expected load as follows:

MIN_TIME=25 minutes (Mins)
MAX_TIME=30 Mins
MAX_PROCESS_UNITS=100K

Task manager 604 operates in inspection mode, as explained above, and generates various metrics that are stored. Table 800 in FIG. 8 is one example of inspection mode metrics that can be stored. As is evident in table 800, when parallel threads increase from 8 to 10, the response time deteriorates, and resource consumption increases. These conditions can be adverse to other services running in that machine. So the resource consumption tripping point (e.g., PROBABLE_NUMBER_OF_MAX_THREADS) is determined to be 8 parallel threads for this particular task.

Now assume task manager 604 turns to run mode and starts the scheduler task for consecutive days (Day 1 and Day 2).

Day 1

First the task manager 604 checks the number of total units to be processed in the source table, i.e., 100K. Based on the stored metrics from inspection mode, 10 parallel threads should be avoided, as it can lead the system to crash. While 8 threads is the tripping point, as explained above in the data of table 800, the MIN_TIME set by the user is 25 Mins. But here, against 8 parallel threads, the time taken is 22 Mins 45 Secs. Even if task manager 604 causes execution of the process in a time less than MIN_TIME, there is no benefit as explained above in the FIG. 3 use case. So, task manager 604 can consider 6 parallel threads. Here, the response time is 25 Mins 21 Secs, which is optimal as MAX_TIME<25 Mins 21 Secs>MIN_TIME. Also, the resource consumption is reasonable, i.e., 69.50% (CPU) and 76.34% (Memory). As such, task manager 604 will spool the optimal parallel threads to execute.

Day 2

Now assume that for the second day, the number of units to be processed is only 1300 (1.3K). A single thread can process a single unit in 1.2 Secs. So 1300 records will get processed in=1300*1.2/60=26 Mins. Since, MAX_TIME<26 Mins>MIN_TIME, there is no need for multiple threads at all. A single thread is enough because it will complete the job within the time expected and resource consumption will be minimal.

In other days, the source load may vary 50K, 75K, etc. From the stored inspection mode metrics, the appropriate threads would be: 50K->2 threads; and 75K->4 threads.

Task manager 604 can re-enter the inspection mode for re-inspection under certain conditions, e.g.: when there is a considerable deviation from the inspected time for the threads; when there is considerable deviation from the resource consumption; and/or periodically (e.g., monthly or some other configurable time). Accordingly, task manager 604 re-inspects and finds the new optimal threads as the environment is subject to change with other processes.

Illustrative embodiments, as explained herein, provide many advantages, by way of example only:
(i) Give the user the ability to specify the time range needed to complete the specific task;
(ii) Online inspected and learned task management to execute long running bulk tasks with pre-determined time for varying data loads;
(iii) Re-inspection and self-correcting ability to adapt to the environment changing over a time period; and
(iv) Dynamically calculate the optimal parallel processes needed for different data loads.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for time-bound task management in container environments will now be described in greater detail with reference to FIGS. 9 and 10. It is to be appreciated that systems and processes described in the context of FIGS. 1-8 can be performed via the platforms in FIGS. 9 and/or 10 but may also be implemented, in whole or in part, in other information processing systems in other embodiments.

Figure 9:
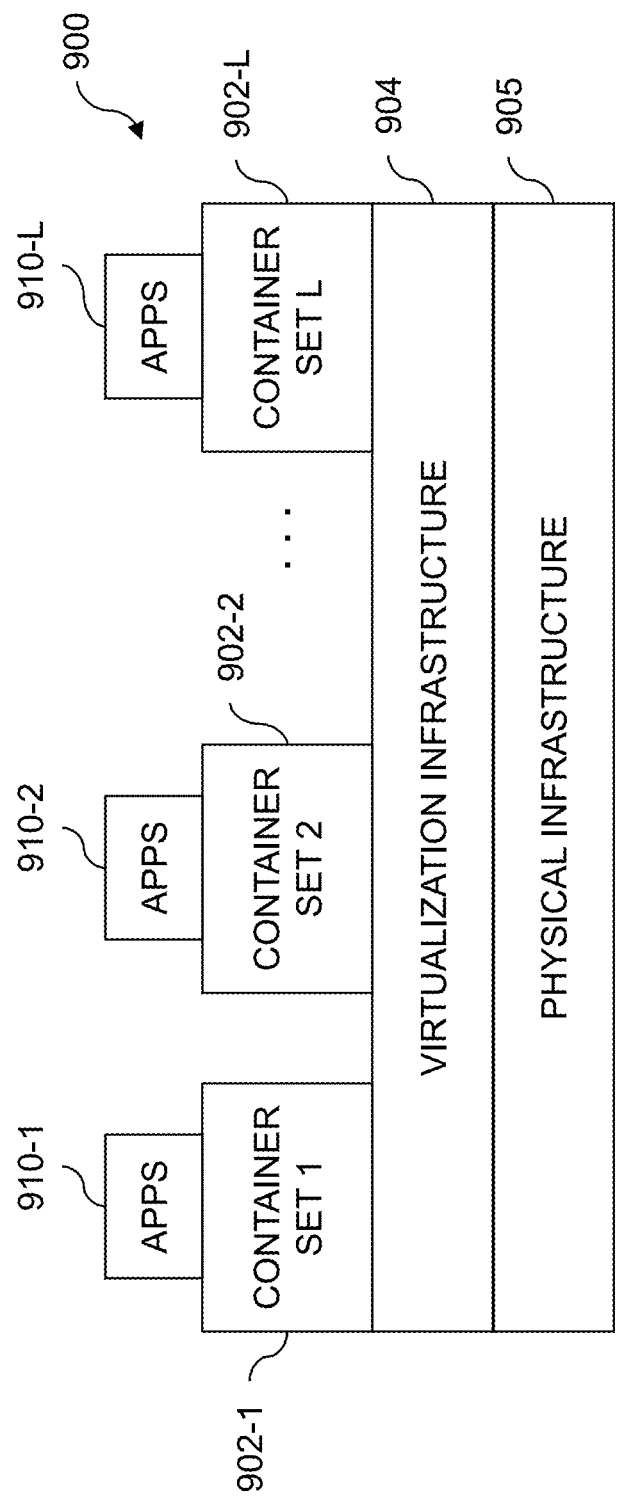
FIGS. 9 and 10 respectively illustrate examples of processing platforms that may be utilized to implement task management with time-bound containerized workload functionality according to one or more illustrative embodiments.
Figure 10:
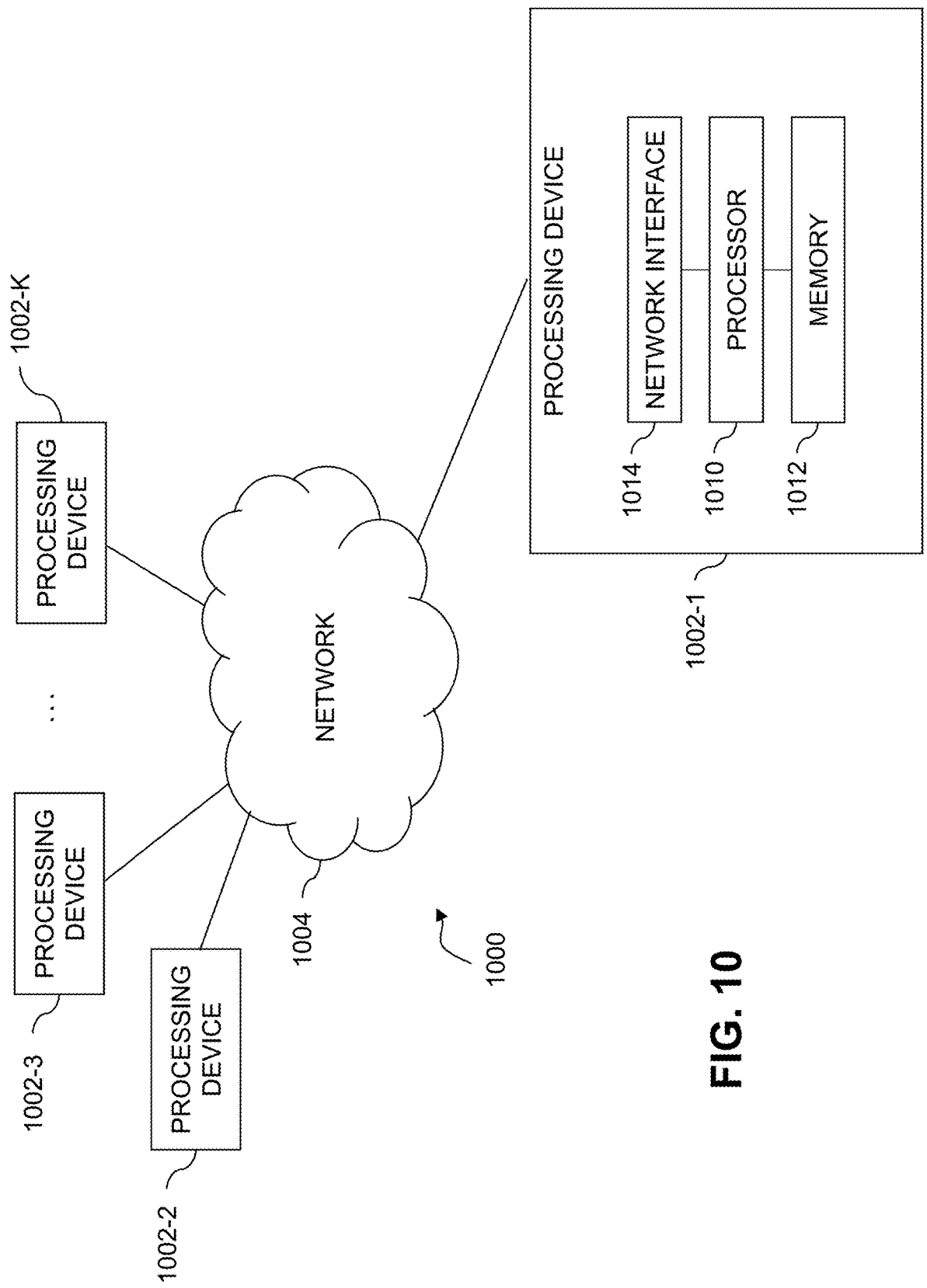

FIG. 9 shows an example processing platform comprising cloud infrastructure 900. The cloud infrastructure 900 comprises a combination of physical and virtual processing resources that may be utilized to implement at least a portion of the information processing systems described herein. The cloud infrastructure 900 comprises multiple container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure.

The cloud infrastructure 900 further comprises sets of applications 910-1, 910-2, . . . 910-L running on respective ones of the container sets 902-1, 902-2, . . . 902-L under the control of the virtualization infrastructure 904. The container sets 902 may comprise respective sets of one or more containers.

In some implementations of the FIG. 9 embodiment, the container sets 902 comprise respective containers implemented using virtualization infrastructure 904 that provides operating system level virtualization functionality, such as support for Kubernetes-managed containers.

As is apparent from the above, one or more of the processing modules or other components described herein may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and/or system 200 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and systems described herein may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, the at least one processing platform, when executing program code, is configured to:
obtain an indication of a data load for a given task, a configured range of time for execution and completion of the given task and a resource utilization limit for executing the given task, wherein the resource utilization limit comprises at least one of a central processing unit consumption threshold and a memory consumption threshold for executing the given task to completion, wherein the configured range of time for execution and completion of the given task is generated by:
receiving a minimum time period to execute and complete the given task and receiving a maximum time period to execute and complete the given task, wherein the configured range of time is greater than the minimum time period and lesser than the maximum time period;
computing a compute a number of processes to be instantiated to execute the given task for the data load within the configured range of time and the within resource utilization limit by:
causing execution of the given task by iteratively adding an additional parallel process to a number of processes for executing the given task and obtaining a round trip processing time and consumption percentage for each iteration, when the time to execute the number of processes is greater than or equal to the received maximum time period;
determining an iteration at which an adverse processing condition occurs and recording the number of processes executed in the iteration; and
determining that a parallel process number threshold is the number of processes executed in the iteration; and
generating the configured range of time based on the parallel process number threshold, the received minimum time period and the received maximum time period;
compute a number of processes to be instantiated to execute the given task for the data load within the configured range of time and within the resource utilization limit; and
schedule the given task to be executed by the computed number of processes within the configured range of time in a parallel processing environment.

2. The apparatus of claim 1, wherein the indication of the data load comprises an indication of a maximum number of data units to be processed for the given task.

3. The apparatus of claim 2, wherein the resource utilization limit further comprises a maximum consumption percentage of a resource to be used to execute the given task.

4. The apparatus of claim 3, wherein the computing the number of processes to be instantiated to execute the given task for the data load within the configured range of time and within the resource utilization limit further comprises:
causing execution of a single data unit of the given task in accordance with a single process;
obtaining a round trip processing time for execution of the single data unit in accordance with the single process; and
obtaining a consumption percentage for at least one resource used for execution of the single data unit in accordance with the single process.

5. The apparatus of claim 4, wherein the computing the number of processes to be instantiated to execute the given task for the data load within the configured range of time and within the resource utilization limit further comprises:
comparing the round trip processing time for execution of the single data unit to the maximum time period of the configured range of time;
computing a product by multiplying the round trip processing time for execution of the single data unit by the maximum number of data units to be processed for the given task when the round trip processing time for execution of the single data unit is less than the maximum time period; and
determining that the number of processes to be instantiated to execute the given task for the data load within the configured range of time and the resource utilization limit is one when the product is less than the maximum time period.

6. The apparatus of claim 5, wherein the computing the number of processes to be instantiated to execute the given task for the data load within the configured range of time and the resource utilization limit further comprises:
selecting a number of parallel processes below the parallel process number threshold for which the resource utilization limit is not exceeded; and
determining that the number of processes to be instantiated to execute the given task for the data load within the configured range of time and the resource utilization limit is the selected number of parallel processes.

7. The apparatus of claim 6, wherein the at least one processing platform, when executing program code, is further configured to cause execution of the given task via the selected number of parallel processes.

8. The apparatus of claim 1, wherein the at least one processing platform, when executing program code, is further configured to perform the obtaining, computing and scheduling during an inspection mode.

9. The apparatus of claim 8, wherein the at least one processing platform, when executing program code, is further configured to cause execution of the given task in a run mode based on the scheduling computed in the inspection mode.

10. The apparatus of claim 9, wherein the at least one processing platform, when executing program code, is further configured to return to the inspection mode based on at least one re-inspection criterion.

11. The apparatus of claim 1, wherein the computed number of processes are executed on a pod-based container orchestration platform.

12. The apparatus of claim 1, wherein the obtaining, computing and scheduling are performed by a task manager associated with a pod-based container orchestration platform.

13. A method comprising:
obtaining an indication of a data load for a given task, a configured range of time for execution and completion of the given task and a resource utilization limit for executing the given task, wherein the resource utilization limit comprises at least one of a central processing unit consumption threshold and a memory consumption threshold for executing the given task to completion, wherein the configured range of time for execution and completion of the given task is generated by:
receiving a minimum time period to execute and complete the given task and receiving a maximum time period to execute and complete the given task, wherein the configured range of time is greater than the minimum time period and lesser than the maximum time period;
computing a compute a number of processes to be instantiated to execute the given task for the data load within the configured range of time and the within resource utilization limit by:
causing execution of the given task by iteratively adding an additional parallel process to a number of processes for executing the given task and obtaining a round trip processing time and consumption percentage for each iteration, when the time to execute the number of processes is greater than or equal to the received maximum time period;
determining an iteration at which an adverse processing condition occurs and recording the number of processes executed in the iteration; and
determining that a parallel process number threshold is the number of processes executed in the iteration; and
generating the configured range of time based on the parallel process number threshold, the received minimum time period and the received maximum time period;
computing a number of processes to be instantiated to execute the given task for the data load within the configured range of time and within the resource utilization limit; and
scheduling the given task to be executed by the computed number of processes within the configured range of time in a parallel processing environment;
wherein the obtaining, computing and scheduling are performed by at least one processing platform comprising at least one processor coupled to at least one memory configured to execute program code.

14. The method of claim 13, wherein at least the obtaining, computing and scheduling are performed during an inspection mode.

15. The method of claim 14, further comprising causing execution of the given task in a run mode based on the scheduling computed in the inspection mode.

16. The method of claim 15, further comprising returning to the inspection mode based on at least one re-inspection criterion.

17. A computer program product comprising a non-transitory processor-readable storage medium having stored therein program code of one or more software programs, wherein the program code when executed by at least one processing platform causes the at least one processing platform to:
obtain an indication of a data load for a given task, a configured range of time for execution and completion of the given task and a resource utilization limit for executing the given task, wherein the resource utilization limit comprises at least one of a central processing unit consumption threshold and a memory consumption threshold for executing the given task to completion, wherein the configured range of time for execution and completion of the given task is generated by:
receiving a minimum time period to execute and complete the given task and receiving a maximum time period to execute and complete the given task, wherein the configured range of time is greater than the minimum time period and lesser than the maximum time period;
computing a compute a number of processes to be instantiated to execute the given task for the data load within the configured range of time and the within resource utilization limit by:
causing execution of the given task by iteratively adding an additional parallel process to a number of processes for executing the given task and obtaining a round trip processing time and consumption percentage for each iteration, when the time to execute the number of processes is greater than or equal to the received maximum time period;
determining an iteration at which an adverse processing condition occurs and recording the number of processes executed in the iteration; and
determining that a parallel process number threshold is the number of processes executed in the iteration; and
generating the configured range of time based on the parallel process number threshold, the received minimum time period and the received maximum time period;
compute a number of processes to be instantiated to execute the given task for the data load within the configured range of time and within the resource utilization limit; and
schedule the given task to be executed by the computed number of processes within the configured range of time in a parallel processing environment.

18. The computer program product of claim 17, wherein:
the indication of the data load comprises an indication of a maximum number of data units to be processed for the given task; and
the resource utilization limit further comprises a maximum consumption percentage of a resource to be used to execute the given task.

19. The computer program product of claim 17, wherein at least the obtaining, computing and scheduling are performed during an inspection mode.

20. The computer program product of claim 19, wherein the program code when executed by at least one processing platform further causes the at least one processing platform to cause execution of the given task in a run mode based on the scheduling computed in the inspection mode.

* * * * *